G. W. N. YOST.
Harvesters.
No. 137,813.  Patented April 15, 1873.
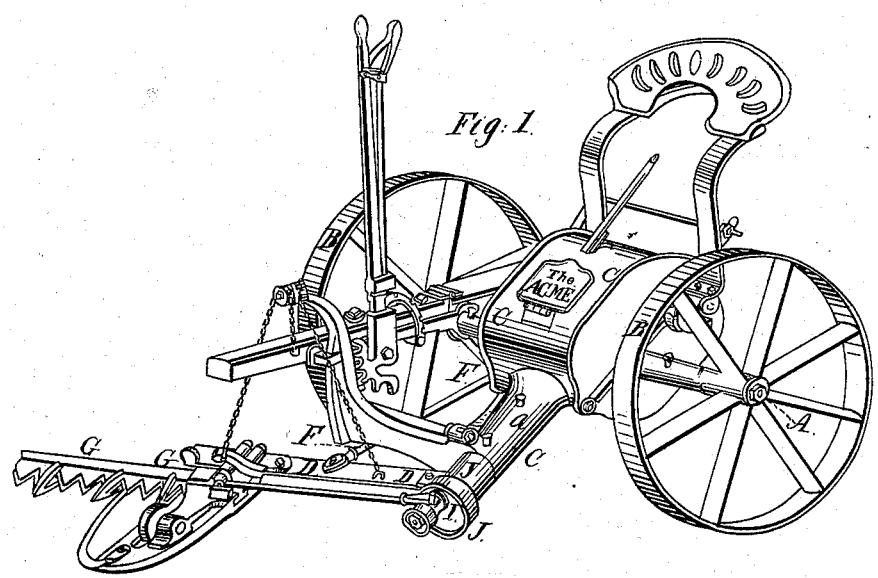
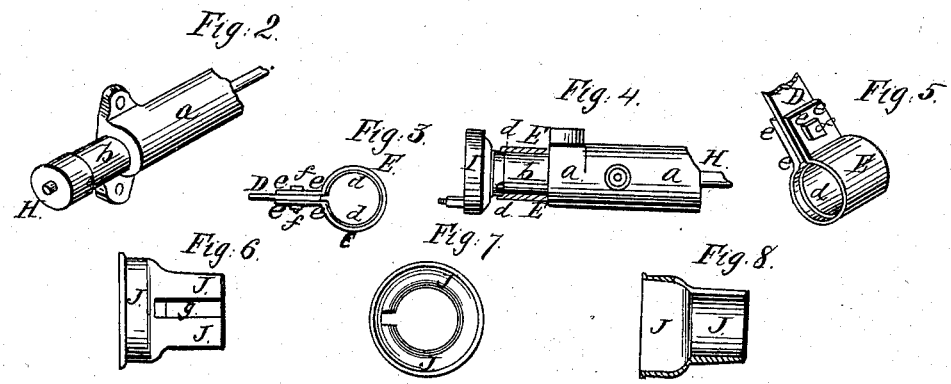
Witnesses
John F. C. Preinkert
John A. Tauberschmidt
Inventor
George W. N. Yost
By James Densmore
Agent.

UNITED STATES PATENT OFFICE.

GEORGE W. N. YOST, OF CORRY, PENNSYLVANIA, ASSIGNOR TO "ACME MOWER AND REAPER COMPANY," OF NEW YORK, N. Y.

IMPROVEMENT IN HARVESTERS.

Specification forming part of Letters Patent No. 137,813, dated April 15, 1873; application filed September 23, 1870.

*To all whom it may concern:*

Be it known that I, GEORGE W. N. YOST, of Corry, Pennsylvania, have invented an Improved Mowing and Reaping Machine, which I call the "Acme," of which the following is a specification:

The nature of that part of the invention included in this division is a combined connecting-bar fastening and crank-wheel shield. The accompanying drawing and the following description thereof fully illustrates that part of the invention included in this division.

Of the drawing, Figure 1 represents a view of my improved mowing-machine. Fig. 2 represents a perspective view of the connecting end of the inclosing-box main frame. Fig. 3 represents an end view of the loop of the connecting-bar. Fig. 4 represents a side view of the connecting end of the main frame and crank-wheel and a sectional view of the loop of the connecting-bar thereon. Fig. 5 represents a perspective view of the loop of the connecting-bar. Fig. 6 represents a side view of a crank-wheel shield. Fig. 7 represents an open end view of a crank-wheel shield, and Fig. 8 represents a sectional view of a crank-wheel shield.

The following is the description: A represents a main axle of a mowing or reaping machine. B represents a driving-wheel on each end of the main axle A. C represents an inclosing-box main frame hinged on the main axle A between the driving-wheels B. *a* represents an end or neck of the main frame C. *b* represents a circumferential recess or groove in and around near the outer end of the neck *a* of the main frame C. *c* represents a shoulder or bead projecting radially from the outer side of the groove *b* of the outer end of the neck *a* of the main frame C. D represents a connecting-bar attached at one end to the outer end of the neck *a* of the main frame C, and to the other end of which is hinged the finger-bar. E represents a band or loop around in the groove *b* on the outer end of the neck *a* of the main frame C, and fastened rigidly to the contiguous end of the connecting-bar D, by which the bar is hinged to the frame. *d* represents a rabbet in the outer edge of what may be called the inner periphery of the loop E of the connecting-bar D, corresponding in depth to that of the groove *b* of the neck *a* of the main frame C. *e* represents a lip at each end of the loop E, lapping onto the end of the connecting-bar D. *f* represents a screw-bolt through the lips *e* of the loop E, and through the end of the connecting-bar D, by which the loop and connecting-bar are fastened rigidly together, and by which the loop and connecting-bar are put on and taken off of the neck *a* of the main frame C. F represents a brace-bar attached to the connecting-bar D between the driving-wheel B and the main frame C, and also attached to the main frame at the end opposite to the neck *a*. G represents a finger-bar attached to the outer end of the connecting-bar D. H represents a gear-wheel axle lengthwise through the neck *a* of the main frame C. I represents a crank-wheel on the outer end of the gear-wheel axle H. J represents an integral annular bell-like metal hood or shield over the crank-wheel I, and over the loop E of the connecting-bar D, and over the outer end of the neck *a* of the main frame C. *g* represents a slot lengthwise in the hood or shield J, through which projects the lips *e* of the loop E and the inner end of the connecting-bar D. That part of the neck *a* of the main frame C which is surrounded by the loop E of the connecting-bar D within the hood or shield J is smaller than that part between the hood and the body of the main frame, so that when the hood is on the outer surface of the combined neck and hood or shield *a* J where joined is uniform, even, and neat. The crank-wheel I on the outer end of the gear-wheel axle H is larger than that part of the hood or shield J which directly surrounds the outer end of the neck *a* of the main frame C, and thereby holds the hood on the main frame without bolts, keys, or any other special fastenings; and the outer end of the hood extends over and protects the crank-wheel and the outer journal of the crank-wheel axle from the clogging and winding of grass, weeds, straw, or any impeding or injuring substance, thus making of the hood a simple, cheap, neat, and perfectly-protecting crank-wheel shield.

In cutting grass or grain, the pressure against the finger-bar G is so severe that the outer end of the connecting-bar D prying against the brace-bar F as a fulcrum tends to thrust the loop E off the main frame C, and requires that the inner or loop end of the connecting-bar be attached very firmly to the main frame; and by putting the loop within the groove b of the main frame, and the lips e through the slot g of the hood or shield J, and the screw-bolt f through the lips of the loop and through the connecting-bar, the connecting-bar very simply and cheaply is practically as firmly attached to the main frame as if it were an integral part thereof.

The following is a summary of that part of the invention included in this division:

I claim—

The combination of a tubular metal crank-wheel shield with the loop of a connecting-bar over the end of the main frame of a mowing or reaping machine, substantially as described.

G. W. N. YOST.

Witnesses:
CHARLES BIRD,
JAMES DENSMORE.